United States Patent [19]

Yoshida

[11] Patent Number: 5,050,209
[45] Date of Patent: Sep. 17, 1991

[54] TELEPHONE SET

[75] Inventor: Hidetaka Yoshida, Tokyo, Japan

[73] Assignee: NEC Corporation, Japan

[21] Appl. No.: 399,720

[22] Filed: Aug. 28, 1989

[30] Foreign Application Priority Data

Aug. 31, 1988 [JP] Japan ............................ 63-113381[U]

[51] Int. Cl.$^5$ ........................ H04M 1/00; H04M 1/04
[52] U.S. Cl. .................................... 379/388; 379/390;
379/397; 379/420; 379/424; 379/432; 379/58
[58] Field of Search ............... 379/387, 388, 390, 397,
379/420, 422, 423, 424, 432, 443, 457, 58

[56] References Cited

U.S. PATENT DOCUMENTS

3,659,050 4/1972 Carlsson et al. ................ 379/432 X
3,772,472 11/1973 Blomberg ........................ 379/432 X
4,178,488 12/1979 Nishihata ........................ 379/432 X

*Primary Examiner*—James L. Dwyer
*Assistant Examiner*—M. Shehata
*Attorney, Agent, or Firm*—Laff, Whitesel, Conte & Saret

[57] ABSTRACT

A telephone set having a telephone set body and a handset unit which incorporate therein a speaker amplifier and a speaker, respectively, and a coil cord interconnecting the speaker amplifier and speaker, the telephone set being selectively usable in an on-hook and an off-hook state. The telephone set is provided with an implementation which, when a conversation is held in an on-hook state, connects the speaker amplifier and speaker without the intermediary of the coil cord to thereby prevent the level of a voice signal from the speaker amplifier from being lowered. In the on-hook state, the handset unit is placed on a cradle. The implementation against the decrease in the voice signal level comprises flat connecting terminals fitted on the bottoms of recesses which are formed in a casing of the handset unit, and flat resilient connecting terminals fitted on the tips of lugs which extend out from a casing of the cradle to mate with the recesses.

7 Claims, 10 Drawing Sheets

Fig. 1A

RECEIVED SIGNAL

TELEPHONE SET

BACKGROUND OF THE INVENTION

The present invention relates to a telephone set of the type having a body and a handset unit which accommodate respectively a speaker amplifier and a speaker, the speaker amplifier and speaker being interconnected by a coil cord to allow a conversation to be held in either one of an on-hook and an off-hook state as desired. More particularly, the present invention is concerned with a telephone set structure capable of preventing the output level of the speaker from being lowered by the impedance of the coil cord.

With a telephone set of the type described, it has been customary to interconnect the speaker amplifier built in the body and the speaker built in the handset unit by a coil cord. Therefore, when a conversation is under way, a voice signal from the speaker amplifier is routed through the coil cord to the speaker of the handset unit, not only in an off-hook state but also in an on-hook state. While the speaker accommodated in the handset unit ordinarily has an impedance of 4 ohms to 8 ohms, the coil cord has an impedance which of 2 ohms to 3 ohms for a length of about 2 meters. Thus, there is a problems that the output of the speaker is attenuated by the impedance of the coil cord, resulting in the level of the voice signal from the speaker being lowered.

SUMMARY OF THE INVENTION

It is therefore an object of the present invention to provide a telephone set which prevents the output of a speaker from being attenuated despite the impedance of a coil cord.

It is another object of the present invention to provide a generally improved telephone set.

A telephone set selectively usable in an on-hook and an off-hook state of the present invention comprises a speaker amplifier for outputting a voice signal in response to a received signal, a speaker to which the voice signal is fed from the speaker amplifier, a coil cord interconnecting the speaker amplifier and speaker, and voice signal level deterioration preventing means for causing the speaker amplifier and speaker into connection with each other in the on-hook state to thereby short-circuit the coil cord, whereby a level of the voice signal from the speaker amplifier is prevented from being lowered by an impedance of the coil cord in the on-hook state.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1A:
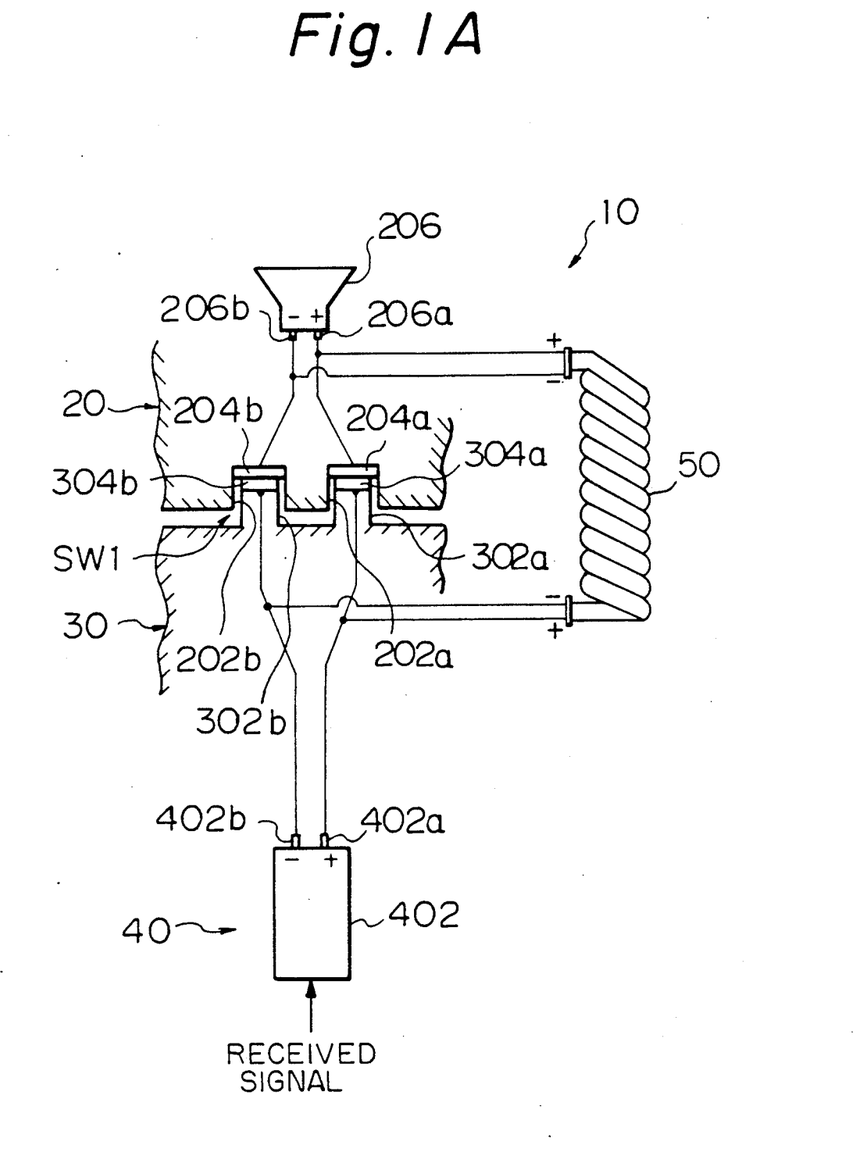
FIGS. 1A and 1B are fragmentary sections showing a telephone set embodying the present invention in an on-hook state and an off-hook state, respectively.
Figure 1B:
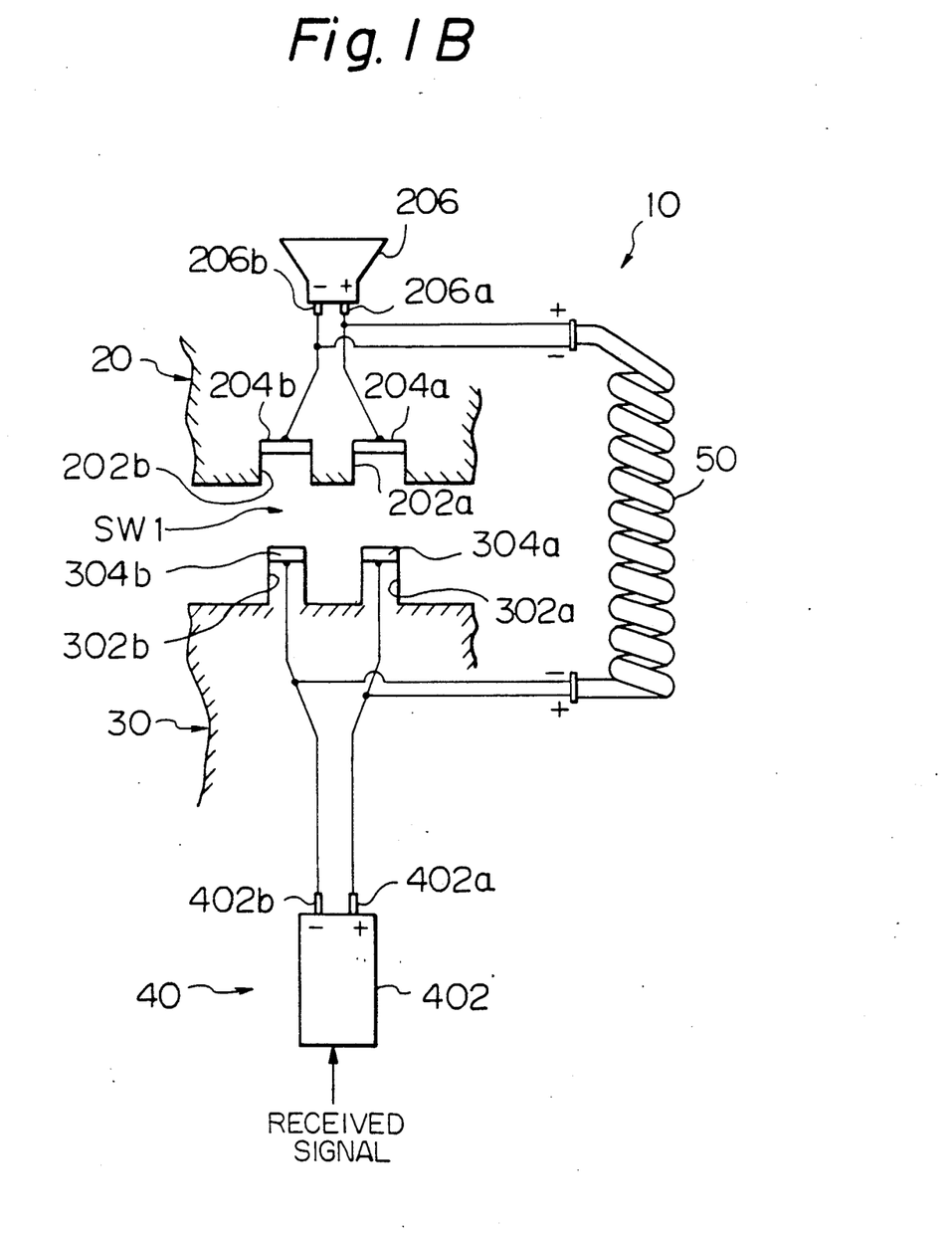

Referring to FIGS. 1A and 1B, a telephone set embodying the present invention is shown and generally designated by the reference numeral 10. As shown, the telephone set 10 is constituted by a handset unit 20 and a cradle 30. FIG. 1A shows the telephone set 10 in an on-hook state wherein the handset unit 20 is placed on the cradle 30, while FIG. 1B shows it in an off-hook state wherein the handset 20 is spaced apart from the cradle 30. A speaker 206 and a speaker amplifier 402 are respectively built in the handset unit 20 and a telephone body 40 and are interconnected by a coil cord 50. A pair of lugs 302a and 302b extend upward from the top of the casing of the cradle 30. Connecting terminals 304a and 304b are fitted on the upper ends of the lugs 302a and 302b, respectively. The speaker amplifier 402 has a positive output terminal 402a and a negative output terminal 402b connecting to the connecting terminals 304a and 304b, respectively. The casing of the handset unit 20 is provided with a pair of recesses 202a and 202b which are associated with the lugs 302a and 302b, respectively. Connecting terminals 204a and 204b are respectively fitted on the bottoms of the recesses 202a and 202band are respectively associated with the connecting terminals 304a and 304b of the cradle 30. The speaker 206 has a positive connecting terminal 206a and a negative connecting terminal 206b connecting to the terminals 204a and 204b, respectively.

As shown in FIG. 1A, when the handset unit 20 is put on the cradle 30, the recesses 202a and 202b of the former mate respectively with the lugs 302a and 302b of the latter to set up an on-hook state. In this condition, the terminals 204a and 204b of the handset unit 20 and the terminals 304a and 304b of the cradle 30 are held in contact with each other, whereby the speaker 206 built in the handset unit 20 is electrically connected to the speaker amplifier 402 of the telephone body 40. A voice signal from the speaker amplifier 402, therefore, is fed to the speaker 206 directly, i.e., not by way of the coil cord 50. More specifically, the impedance of the coil cord 50 is short-circuited to prevent the level of the voice signal from the speaker amplifier 402 from being lowered. Hence, the connecting terminals 204a, 204b, 304a and 304b play the role of means for eliminating the decrease in the level of the voice signal. Such means will hereinafter be referred to as voice signal level deterioration preventing means is generally labeled SW1 in the drawings. As shown in FIG. 1B, when the telephone set 10 goes off-hook, i.e., when the handset unit 20 is picked up from the cradle 30, the terminals 204a and 204b are brought out of contact with their associated terminals 304a and 304b resulting in the electrical connection of the speaker 206 and speaker amplifier 402 via those terminals being cancelled. Nevertheless, the speaker 206 and speaker amplifier 402 are interconnected by the coil cord 50, as is the case with the prior art telephone set. In this condition, the voice signal from the speaker amplifier 402 is fed to the speaker 206 via the coil cord 50. This will prevent a conversion from being interrupted even if the telephone set 10 goes off-hook while the conversion is under way.

Figure 2:
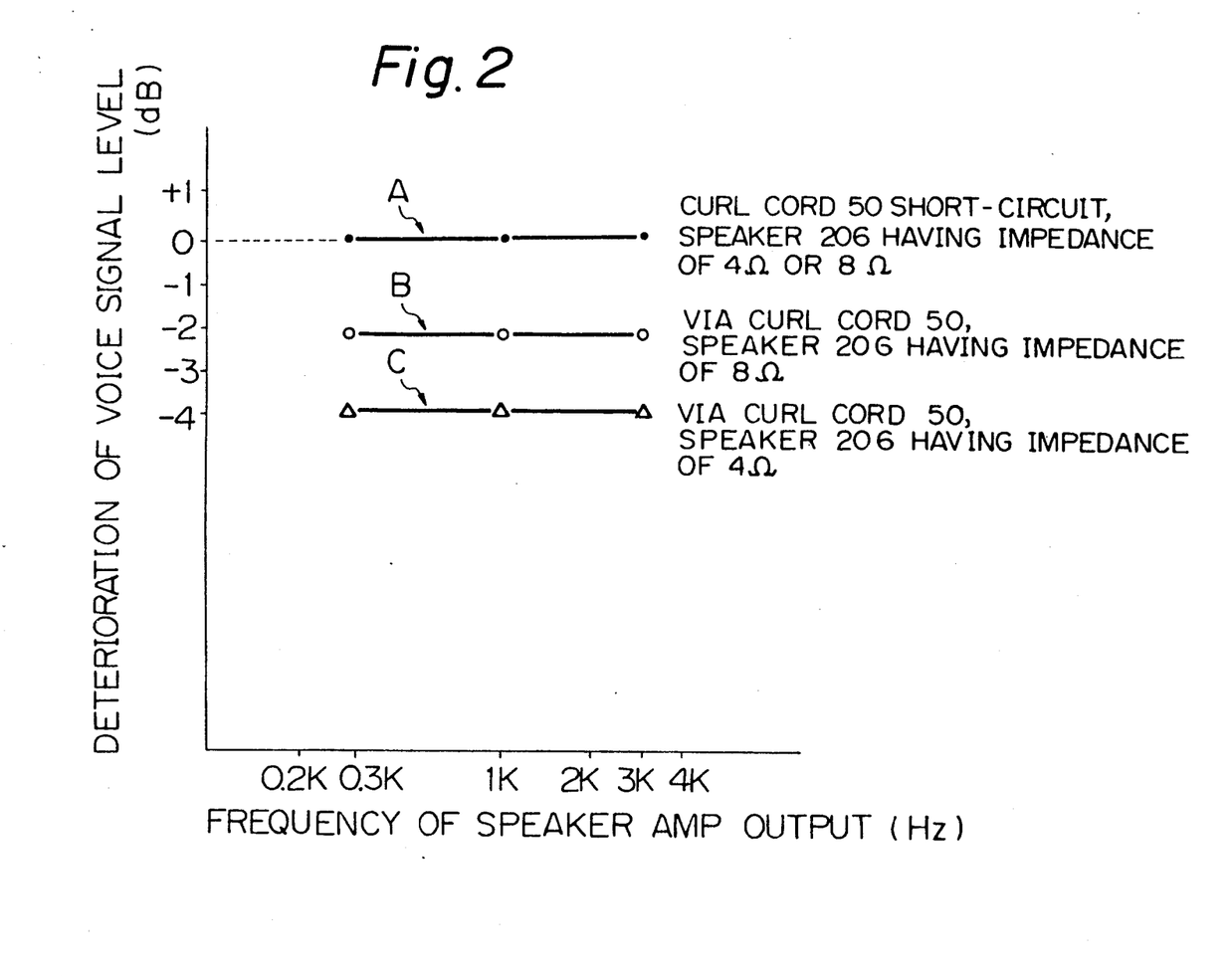
FIG. 2 is a graph showing a voice signal level attainable when a conversation is held in an on-hook state and a voice signal level attainable when it is held in an off-hook state.

Reference will be made to FIG. 2 for describing a voice signal level particular to the on-hook state shown in FIG. 1A, and a voice signal level particular to the off-hook state shown in FIG. 1B. In the on-hook state the speaker amplifier 402 and speaker 206 are directly interconnected by the voice signal level deterioration preventing means SW1 which is constituted by the terminals 204a, 204b, 304a and 304b while, in the off-hook state, they are interconnected by the coil cord 50, as stated earlier. In FIG. 2, the abscissa indicates the frequency of an output signal of the speaker amplifier 402, and the ordinate shows the amount of deterioration of the voice signal level. A curve A is representative of the level (0 decibel) of the voice signal which is associated with the on-hook state shown in FIG. 1A (this level will hereinafter be referred to as a reference level). In this instance, the speaker 206 is assumed to have an impedance of 4 ohms or 8 ohms. A curve B shows the level (about −2 decibel) of the voice signal which is associated with the off-hook state shown in FIG. 1B, the speaker 206 being assumed to have an impedance of 8 ohms. As shown, the voice signal level represented by the curve B is about 2 decibels lower than the reference level. Further, a curve C shows the level (about −4 decibel) of the voice signal which is derived from the speaker 206 having an impedance of 4 ohms. The voice signal level indicated by the curve C is about 4 decibels lower than the reference level. It will be seen that the level of the output voice signal is noticeably lowered when use is not made of the voice signal level deterioration preventing means SW1 of the illustrative embodiment.

Figure 3A:
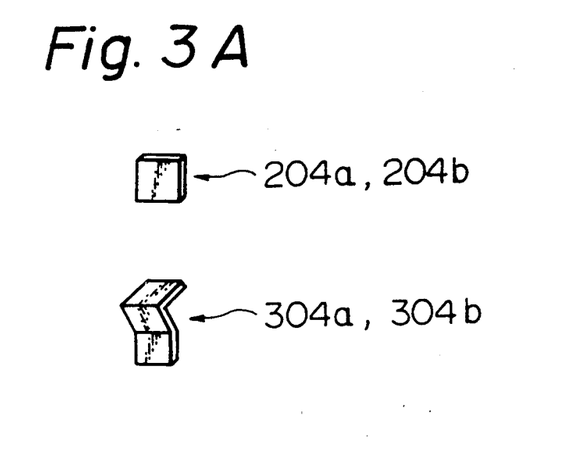
FIG. 3A is a perspective view showing specific configurations of coactive connecting terminals which constitute voice signal level deterioration preventing means which is included in the telephone set of the present invention.
Figure 3B:
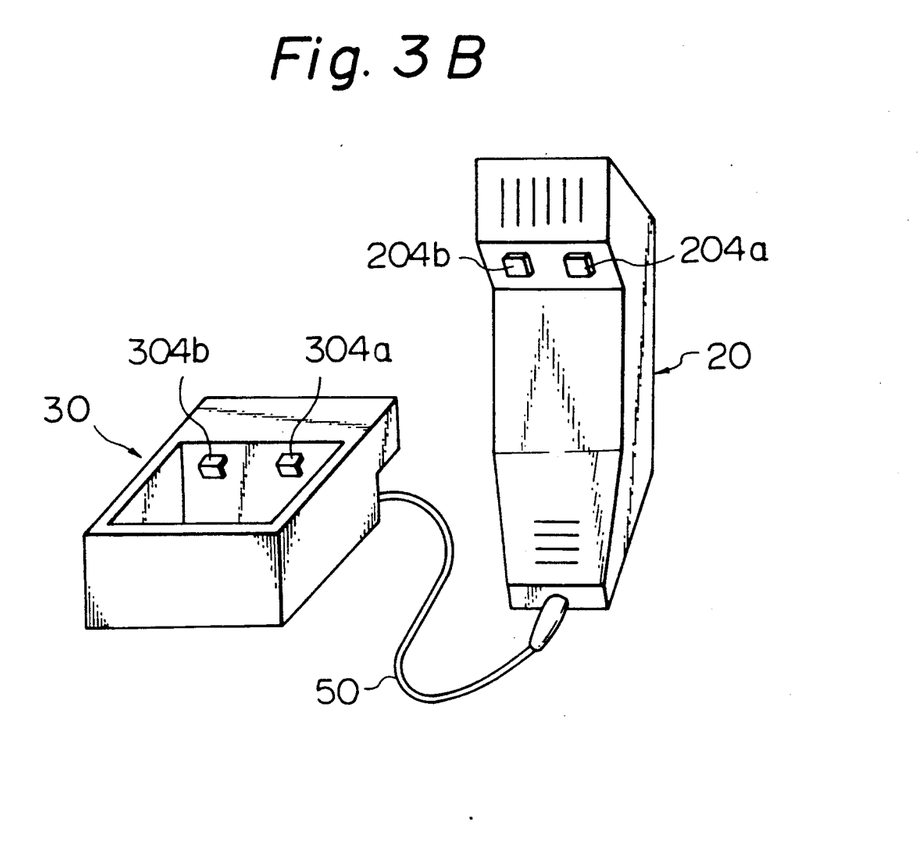
FIG. 3B is a perspective view of a handset unit and a cradle on which the connecting terminals shown in FIG. 3A are fitted.
Figure 4A:
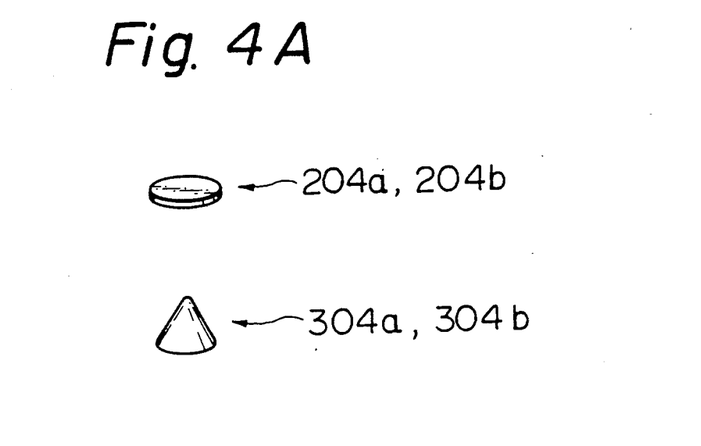
FIG. 4A is a perspective view of alternative configurations of the connecting terminals.
Figure 4B:
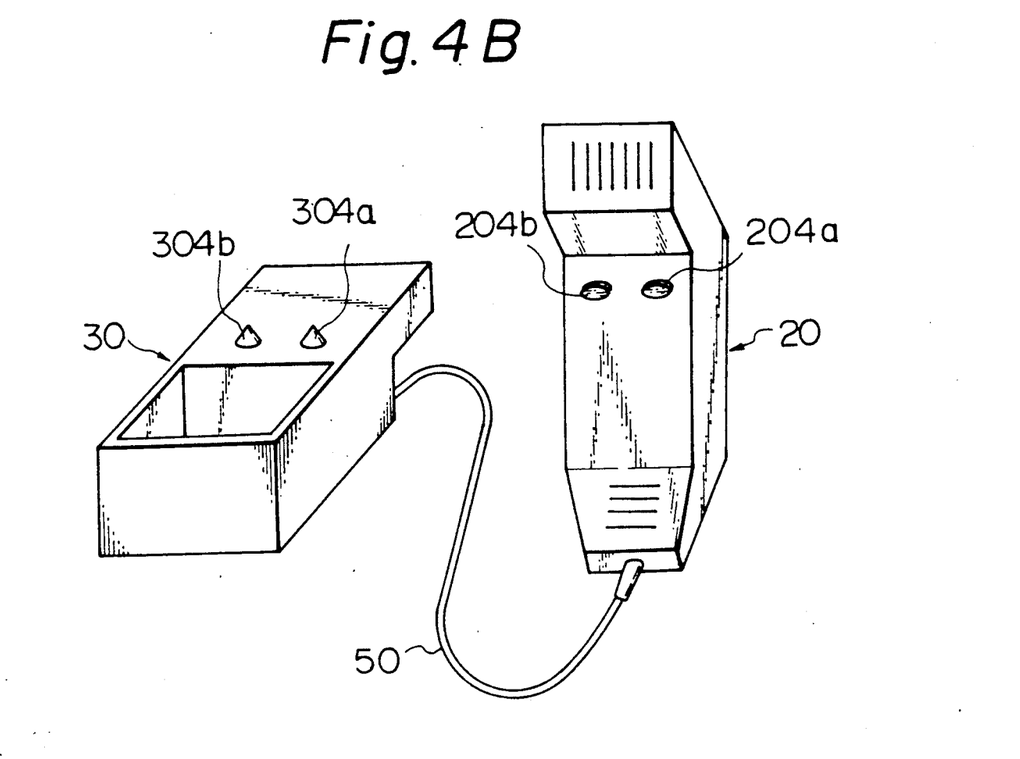
FIG. 4B is a perspective view showing a handset unit and a cradle on which the connecting terminals shown in FIG. 4A are fitted.
Figure 5A:
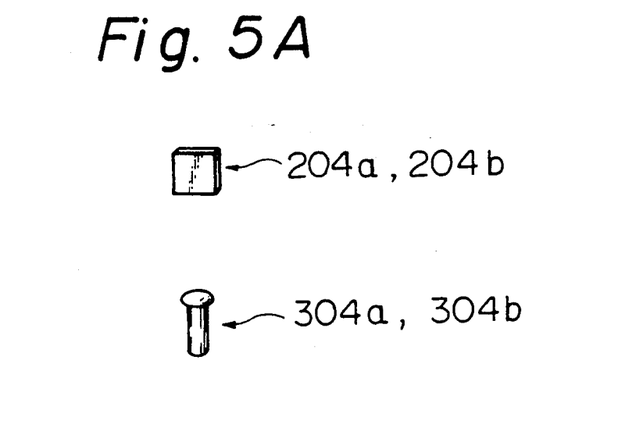
FIG. 5A is a perspective view of further alternative configurations of the connecting terminals.
Figure 5B:
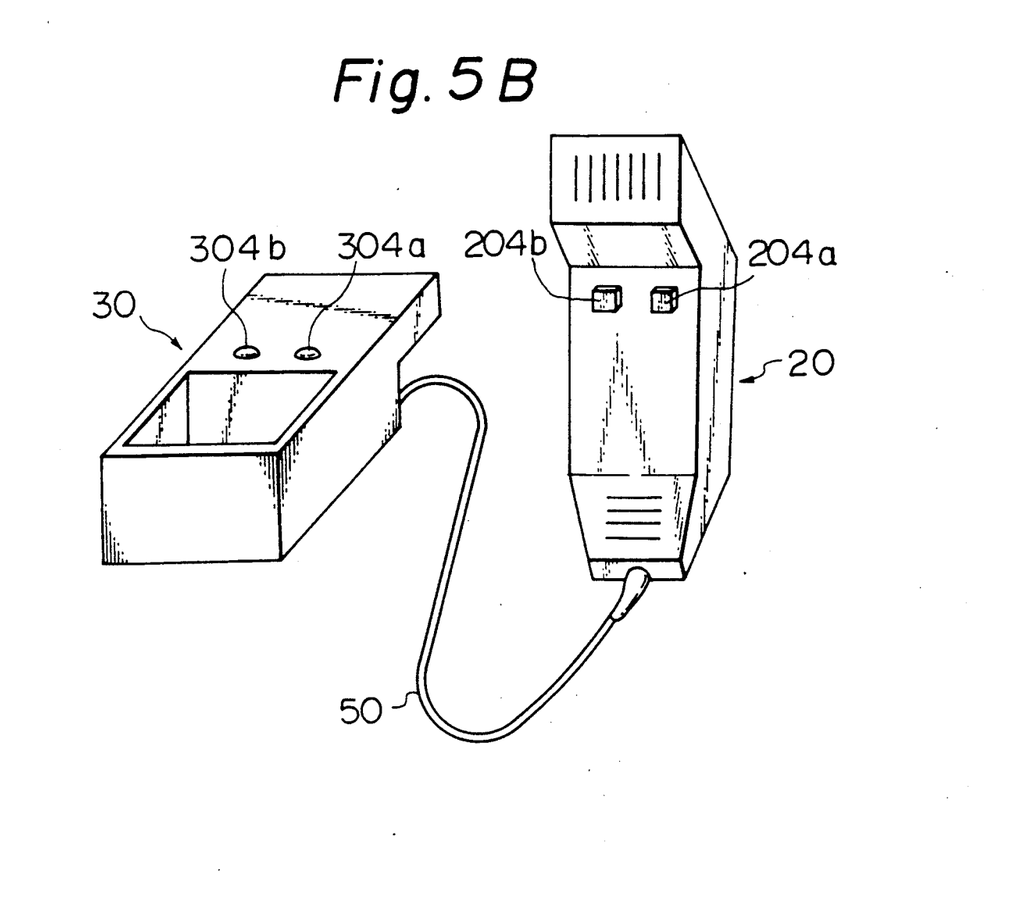
FIG. 5B is a perspective view showing a handset unit and a cradle on which the connecting terminals shown in FIG. 5A are fitted.

Referring to FIG. 3A, there are shown a specific configuration of the connecting terminals 204a and 204b of the handset unit 20 (only one is shown) and a specific configuration of the connecting terminals 304a and 304b of the cradle 30 (only one is shown). As shown, the connecting terminal 204a or 204b is implemented as a flat rectangular piece, while the connecting terminal 304a or 304b is implemented as a shaped resilient piece. Such connecting terminals 204a and 204b and connecting terminals 304a and 304b are respectively fitted on the handset unit 20 and cradle 30, as shown in FIG. 3B. FIG. 4A shows an alternative configuration of the connecting terminal 204a or 204b and an alternative configuration of the connecting terminal 304a or 304b. In FIG. 4A, the terminal 204a or 204b and the terminal 304a or 304b have a flat circular shape and a conical shape, respectively. FIG. 4B shows such circular terminals 204a and 204b and conical terminals 304a and 304b which are mounted on the handset unit 20 and cradle 30, respectively. Further, FIG. 5A shows another specific configuration of the connecting terminal 204a or 204b and another specific configuration of the connecting terminal 304a or 304b. In FIG. 5A, the terminal 204a or 204b has a flat rectangular shape, while the terminal 304a or 304b has a pin-like shape. FIG. 5B shows the flat rectangular terminals 204a and 204b and pin-like terminals 304a and 304b being mounted on the handset unit 20 and cradle 30, respectively.

Figure 6:
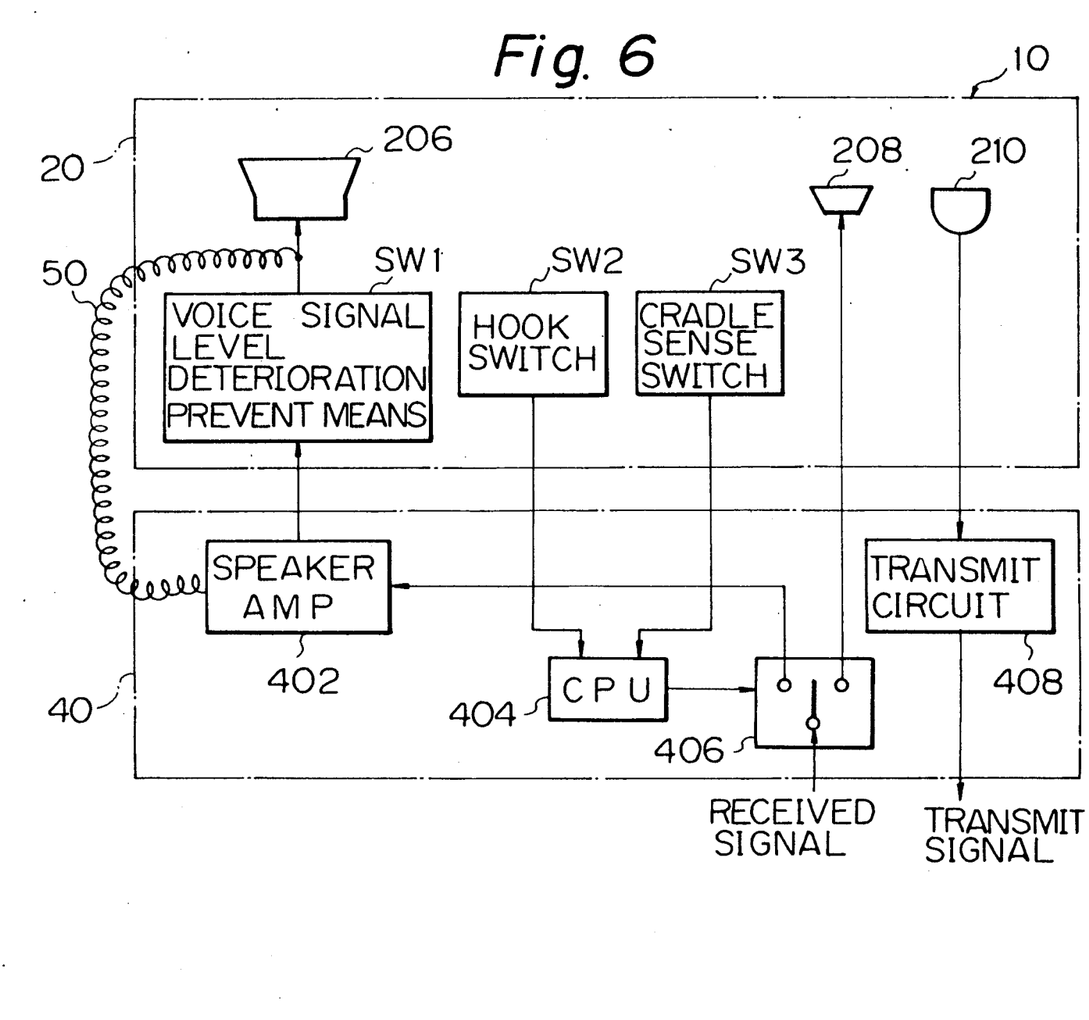
FIG. 6 is a schematic block diagram showing a specific construction of the telephone set of the present invention.

Referring to FIG. 6, a more specific construction of the telephone set 10 is shown. As shown, the handset unit 20 has a hook switch SW2, a cradle sensing switch SW3, a receiver 208 and a microphone 210, in addition to the speaker 206 and voice signal level deterioration preventing means SW1. On the other hand, the telephone body 40 has a CPU (Central Processing Unit), 404, a speaker/receiver selector in the form of a switch 406, and a transmitting circuit 408 as well as the speaker amplifier 402. The outputs of the hook switch SW2 and cradle sensing switch SW3 are connected to the CPU 404. The speaker/receiver selector 406 selects either one of the speaker 206 and the receiver 208 in response to an output of the CPU 404 and a received signal. The transmitting circuit 408 sends a voice signal from the microphone 210 in the form of a transmit signal. The speaker/receiver selector 406 selectively feeds a received signal to the speaker 206 and receiver 208, as shown in Table 1 below.

TABLE 1

| SPEAKER/RECEIVER SELECTOR 406 | HOOK SWITCH SW2 | CRADLE SENSE SWITCH SW3 |
|---|---|---|
| SPEAKER 206 | ON | ON (PRESENT) |
| RECEIVER 208 | ON | OFF (ABSENT) |
| — | OFF | — |

Figure 7:
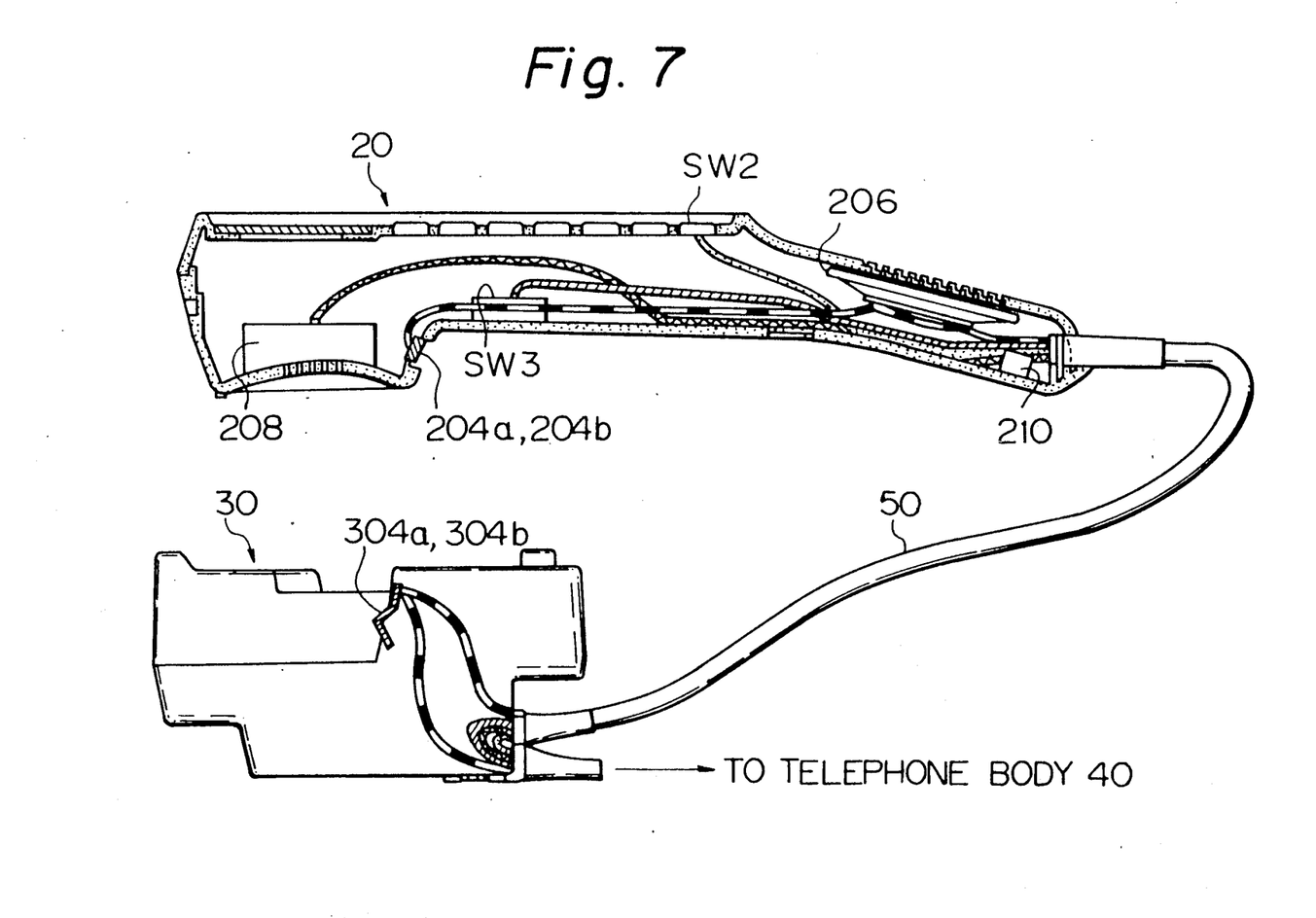
FIG. 7 is a sectional side elevation showing the internal arrangement of the telephone set shown in FIG. 6.

FIG. 7 illustrates a specific arrangement of the microphone 210, speaker 206, hook switch SW2, cradle sensing switch SW3, receiver 208, and voice signal level deterioration preventing means SW1 of the illustrative embodiment, i.e., connecting terminals 204a, 204b, 304a and 304b together with wirings associated therewith.

Figure 8:
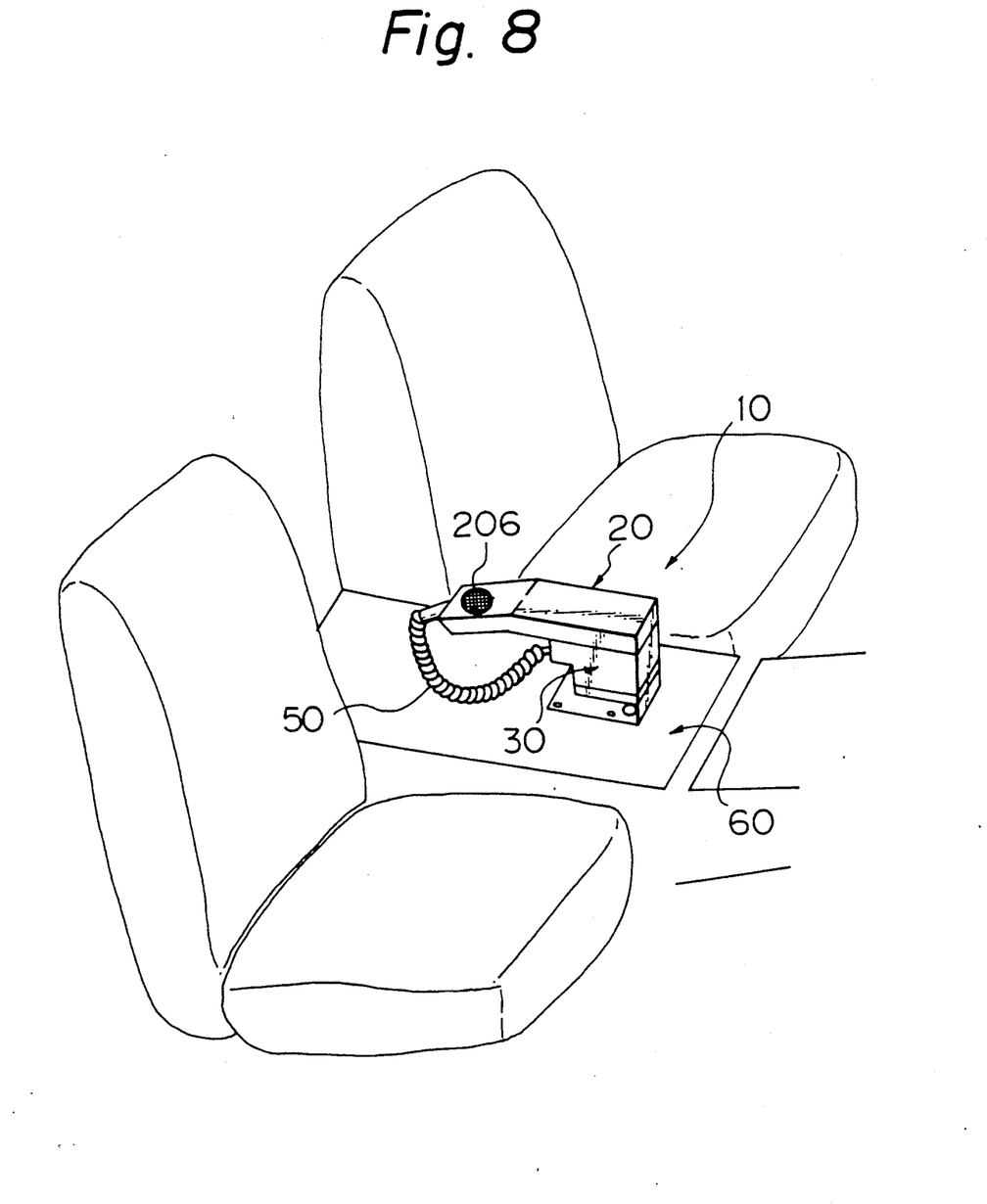
FIG. 8 shows a specific application of the telephone set of the present invention.
Figure 9:
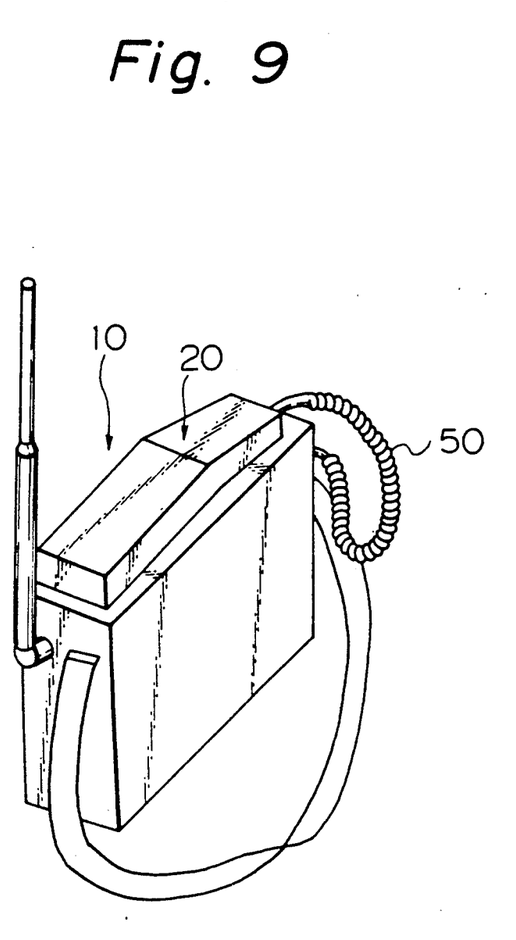
FIG. 9 shows another specific application of the telephone set of the present invention.

As shown in FIG. 8, the telephone set 10 shown and described may be mounted on a console 60 which is located in the passenger compartment of a motor vehicle. Alternatively, as shown in FIG. 9, the telephone set 10 may be mounted on hand-held radio equipment.

In summary, it will be seen that the present invention provides a telephone set capable of eliminating the attenuation of the output of a speaker otherwise caused by the impedance of a coil cord during the course of an on-hook communication, as distinguished from an off-hook communication.

Various modifications will become possible for those skilled in the art after receiving the teachings of the present disclosure without departing from the scope thereof. For example, the speaker amplifier 402 which has been shown and described as being incorporated in the telephone body 40 may be built in the cradle 30. The lugs 302a and 302b of the cradle 30 and the recesses 202a and 202b of the handset unit 20 may be replaced with each other. Further, the configurations of the connecting terminals 204a, 204b, 304a and 304b shown in any of FIGS. 3A, 4A and 5A are only illustrative and may be replaced with any other suitable configurations.

What is claimed is:

1. A telephone set selectively usable in an on-hook and an off-hook state, said set comprising:

a speaker amplifier;

a speaker;

a handset unit and a cradle having an on-cradle position and an off-cradle position;

a coiled cord including a pair of wires for interconnecting said speaker amplifier and said speaker and for feeding a voice signal which is responsive to a received signal from said speaker amplifier to said speaker when said handset unit is in the on-cradle position; and electrical circuit means coupled to both ends of each of said wires for providing parallel connections to said pair of wires in order to substantially short-circuit each of said wires when said telephone set is in the on-cradle position;

whereby the voice signal of said speaker amplifier is supplied to the speaker with less attentuation when the telephone set if in the on-cradle position than the attenuation that is present when the telephone set is in the off-cradle position.

2. A telephone set as claimed in claim 1, further comprising a telephone body, said speaker being incorporated in said handset unit, and said speaker amplifier being incorporated in either said telephone body or said cradle.

3. A telephone set as claimed in claim 2, wherein said electrical circuit means comprises a positive and a negative connecting terminal member provided on said handset unit and a positive and a negative connecting terminal member provided on said cradle, said connecting terminal members on said handset unit and said connecting terminal member on said cradle contacting each other when the handset is in the on-cradle position in order to connect said speaker amplifier and said speaker to each other.

4. A telephone set as claimed in claim 3, wherein either one of said connecting terminal members on said handset unit and said connecting terminal members on said cradle comprises flat rectangular members, while the other comprises shaped resilient members.

5. A telephone set as claimed in claim 3, wherein either one of said connecting terminal members on said handset unit and said connecting terminal members on said cradle comprises flat circular members, while the other comprises conical members.

6. A telephone set as claimed in claim 3, wherein either one of said connecting terminal members on said handset unit and said connecting terminal members on said cradle comprises flat rectangular members, while the other comprises pin-like members.

7. A telephone set as claimed in claim 3, wherein either one of said connecting terminal members on said handset unit and said connecting terminal members on said cradle is fitted on tips of a pair of lugs which are provided on either said handset unit or said cradle, while the other connecting terminal members are fitted on bottoms of a pair of recesses which are provided in the other of said handset unit or said cradle and individually mate with said pair of lugs when said handset is in the on-cradle position.

* * * * *